United States Patent
Sasaki et al.

[11] Patent Number: 5,939,976
[45] Date of Patent: Aug. 17, 1999

[54] INTERSECTION WARNING SYSTEM

[75] Inventors: Kenji Sasaki, Gotenba; Yuji Kobayashi, Fuchu; Noriaki Hattori, Anjo; Kazuhiko Yamaguchi, Gifu, all of Japan

[73] Assignee: Toyota Jidosha Kabushiki Kaisha, Hino Jidosha Kogyo Kabushiki Kaisha, Aisin Seiki Kabushiki Kaisha, and Denso Corporation, Japan

[21] Appl. No.: 09/126,132

[22] Filed: Jul. 30, 1998

[30] Foreign Application Priority Data

Jul. 31, 1997 [JP] Japan .................................. 9-206969

[51] Int. Cl.$^6$ ...................................... B60Q 1/00
[52] U.S. Cl. ...................... 340/435; 340/436; 340/903; 342/70
[58] Field of Search .................... 340/435, 436, 340/903; 342/70

[56] References Cited

U.S. PATENT DOCUMENTS

| | | | |
|---|---|---|---|
| 5,751,211 | 5/1998 | Shirai et al. | 340/435 |
| 5,798,727 | 8/1998 | Shirai et al. | 342/70 |
| 5,806,019 | 9/1998 | Ishiyama | 701/300 |

FOREIGN PATENT DOCUMENTS 57-117096  7/1982  Japan .

*Primary Examiner*—Jeffery A. Hofsass
*Assistant Examiner*—Tai Nguyen
*Attorney, Agent, or Firm*—Finnegan, Henderson, Farabow, Garrett & Dunner, L.L.P.

[57] ABSTRACT

An intersection warning system provided in a vehicle includes a receiving unit that receives watching information, about states of bodies in a watching area including an intersection, from a road watching apparatus, a vehicle position detecting unit that detects a position of the vehicle, a dead angle area calculation unit that calculates a dead area for the vehicle based on the position detected by the vehicle position detecting unit and the watching information received by the receiving unit, a first determination unit that determines whether there is another vehicle in the dead angle area calculated by the dead angle area calculation unit, a running state detecting unit that detects a running state of the vehicle, a second determination unit that, when the first determination unit determines that there is another vehicle in the dead angle, determines, based on the running state of the vehicle detected by the running state detecting unit and the watching information about the another vehicle in the dead angle area, whether a driving operation for the vehicle is appropriate, and a warning unit that issues a warning based on a determination result obtained the second determination unit.

5 Claims, 13 Drawing Sheets

INTERSECTION WARNING SYSTEM

BACKGROUND OF THE INVENTION

1. Field of the Invention

The present invention generally relates to an intersection warning system, and more particularly to an intersection warning system supplying, to an driver of a vehicle straightly passing through an intersection or turning at the intersection, information about another vehicle in a dead angle area of the driver, and warning based on the relationship between the vehicle and the other vehicle in the dead angle area.

2. Description of the Related Art

Conventionally, a vehicle collision warning system has been proposed (Japanese Laid Open Patent Application No.57-117096). In the vehicle's collision warning system, when a vehicle stands by for turn to the right at an intersection, it is determined whether a two-wheeled vehicle (e.g., a motorcycle) detected, by a roadside device, straightly passing through the intersection from the opposite side is in danger of being contact with the vehicle. Based on the determination result, a warning is issued in the vehicle. A driver of the vehicle standing by for turning to the right at the intersection actually ascertains the state of another vehicle from the opposite side by eyes and ascertains whether a warning is issued by the vehicle collision warning system. Thus, the driver can drive the vehicle to more securely turn to the right at the intersection.

Even if other vehicles are actually watched by a driver of a vehicle standing by for turning to the right at the intersection, the conventional vehicle's collision warning system as described above is activated for the other vehicles. Thus, although the driver drives the vehicle watching the other vehicles, a warning may be issued. In such a case, the warning may be officious for the driver.

SUMMARY OF THE INVENTION

Accordingly, a general object of the present invention is to provide a novel and useful intersection warning system in which the disadvantages of the aforementioned prior art are eliminated.

A specific object of the present invention is to provide an intersection warning system capable of issuing a warning based on information, about another vehicle approaching an intersection from the opposite side, actually needed by a driver of a vehicle which is going to pass the intersection (or turn right or left at the intersection).

The above objects of the present invention are achieved by an intersection warning system provided in a vehicle comprising: a receiving unit that receives watching information about states of bodies in a watching area including an intersection, the watching information being transmitted from a road watching apparatus which watches the watching area; a vehicle position detecting unit that detects a position of the vehicle; a dead angle area calculation unit that calculates a dead area for the vehicle based on the position detected by the vehicle position detecting unit and the watching information received by the receiving unit; a first determination unit that determines whether there is another vehicle in the dead angle area calculated by the dead angle area calculation unit; a running state detecting unit that detects a running state of the vehicle; a second determination unit that, when the first determination unit determines that there is another vehicle in the dead angle, determines, based on the running state of the vehicle detected by the running state detecting unit and the watching information about the another vehicle in the dead angle area, whether a driving operation for the vehicle is appropriate; and a warning unit that issues a warning based on a determination result obtained the second determination unit.

In the above intersection warning system, the dead angle area for the vehicle approaching the intersection is calculated based on the watching information, about the bodies in the watching area, supplied from the road watching apparatus. It is then determined, based on the running state of the vehicle and the watching information about another vehicle in the dead angle area, whether the driving operation for the vehicle is appropriate. The warning is issued based on the determination result. The driver of the vehicle can determines, based on the warning, whether the driving operation is appropriate for conditions in which there is another vehicle in the dead angle area.

The bodies to be watched by the road watching apparatus includes vehicles, walkers and structures (median strips, road signs and the like). The watching information may include a position of each body, a moving speed of each body, a size of each body and the like.

The dead angle area calculation unit may comprise a position calculating unit that calculates a position of a driver of the vehicle based on the position detected by the vehicle position detecting unit; and a unit that calculates the dead angle area for the driver based on the watching information about a body facing the vehicle, the dead angle area being formed by the body.

In a case where the vehicle turns at the intersection so as to cross the opposite lane (turn right in a case where every vehicle ought to run in the left side on a road or turn left in a case where every vehicle ought to run in the right side on a road), the driver has to pay attention to vehicles approaching the intersection in the dead angle area formed by a vehicle which is going to turn at the intersection or straightly pass through the intersection.

Thus, the intersection warning system according to the present invention may further comprises a first course determination unit that determines whether the vehicle is going to turn at the intersection so as to cross an opposite lane, wherein when the first course determination unit determines that the vehicle is going to turn at the intersection so as to cross the opposite lane, the dead angle area calculation unit calculates the dead angle area for the vehicle formed by anther vehicle in the opposite lane.

In such an intersection warning system, when it is determined that the vehicle is going to turns at the intersection so as to cross the opposite lane, the driver is provided with the information indicating whether there is another vehicle approaching the intersection in the dead angle area formed by a vehicle in the opposite lane. Based on the relationship between the vehicle and another vehicle in the dead angle area, the warning is issued.

In addition, in a case where the vehicle is going to straightly pass through the intersection, the driver has to pay attention to the state of another vehicle turning toward the vehicle going to straightly pass through the vehicle in the dead angle area. The dead angle area is formed by a vehicle which is set in the same direction as the vehicle going to straightly pass through the intersection and at a position in front of the vehicle and near the opposite lane (at a position in the right front side of the vehicle going to straightly pass through the intersection in a case where every vehicle ought to run in the left side on a road or at a position in the left front side of the vehicle going to straightly pass through the intersection in a case where every vehicle ought to run in the right side on a road).

Thus, the intersection warning system according to the present invention may further comprises a second course determination unit that determines whether the vehicle is going to straightly pass through the intersection, wherein when the second course determination unit determines that the vehicle is going to straightly pass through the intersection, the dead angle area calculation units calculates the dead angle area for the vehicle formed by another vehicle which is put in the same direction of the vehicle and at a position in front of the vehicle and near an opposite lane.

In such an intersection warning system, when it is determined the vehicle is going to straightly pass through the intersection, the driver is provided with information indicating whether there is another vehicle in the dead angle area formed by a vehicle which is running in the same direction as the vehicle going to straightly pass through the intersection and at a position in front of the vehicle and near the opposite lane. Based on the relationship between the vehicle going to straightly pass through the intersection and another vehicle in the dead angle area, the warning is issued.

In order to prevent collision even if the driving operation is not corrected when the warning is issued, the intersection warning system according to the present invention may further comprise a braking control unit that carries out braking control of the vehicle based on the determination result obtained by the second determination unit.

BRIEF DESCRIPTION OF THE DRAWINGS

Other objects, features and advantages of the present invention will be apparent from the following description when read in conjunction with the accompanying drawings, in which.

DESCRIPTION OF THE PREFERRED EMBODIMENTS

A description will be given of an embodiment of the present invention.

Figure 1:
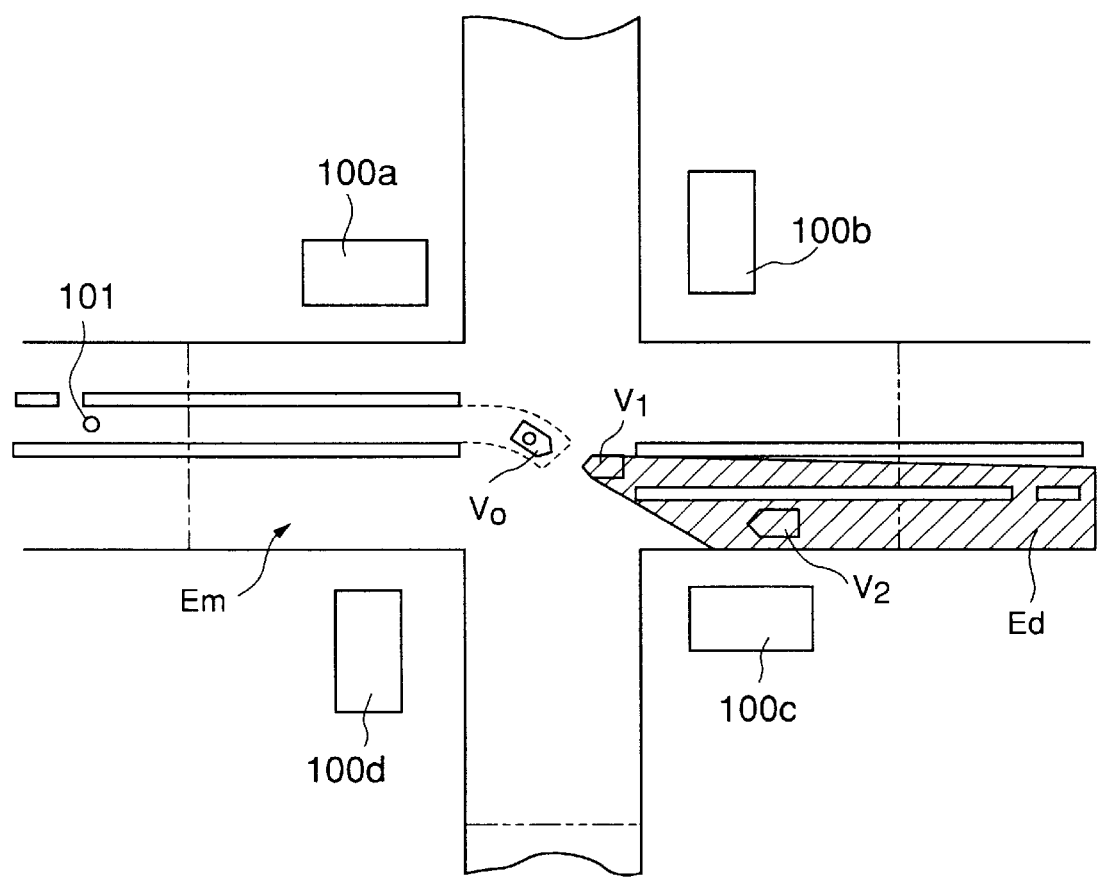
FIG. 1 is a diagram illustrating a first example of a state of an intersection which is to be watched by a road watching apparatus.
Figure 2:
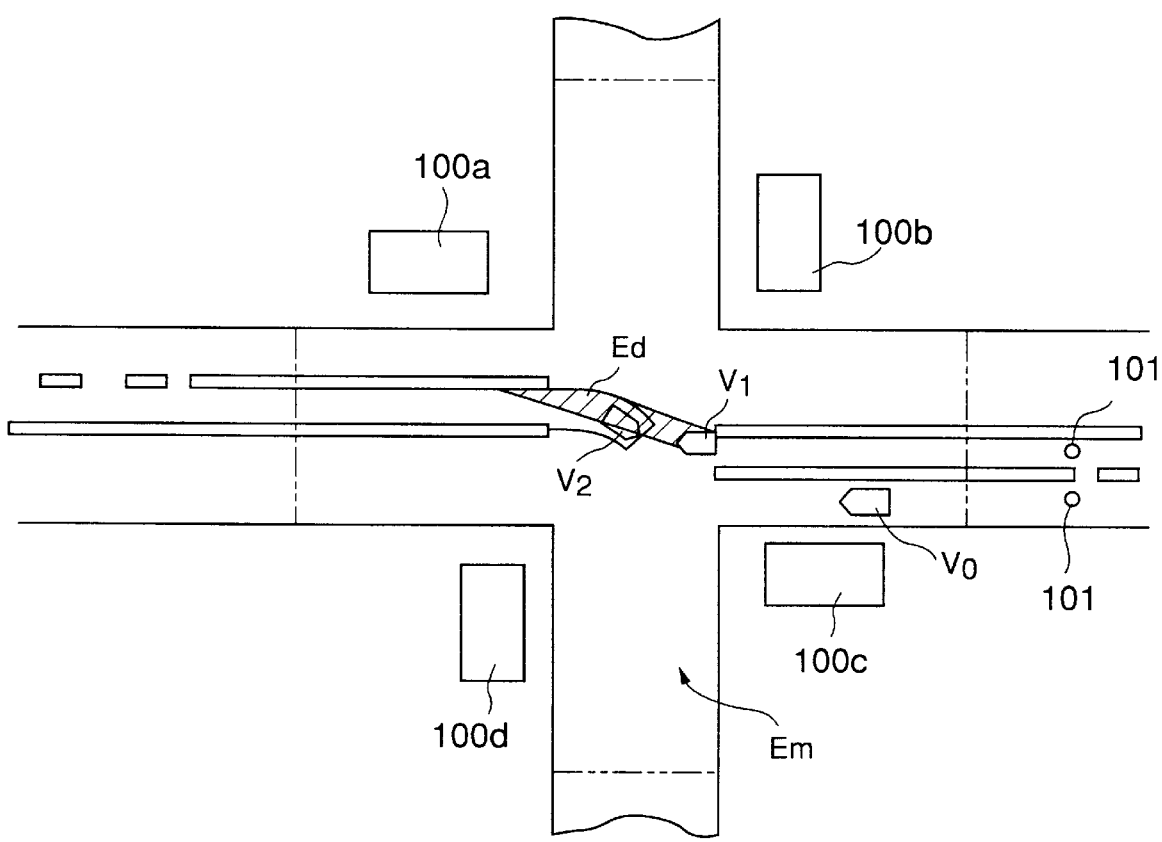
FIG. 2 is a diagram illustrating a second example of the state of the intersection which is to be watched by the road watching apparatus.

States of an intersection which should be watched are shown in FIGS. 1 and 2. Referring to FIGS. 1 and 2, a predetermined area including an intersection at which two roads intersect each other is set as a watching area Em (indicated by a chain line). A roadside apparatus takes pictures of the watching area and calculates positions, sizes, moving speeds of bodies (vehicles, walkers, structures (a medium strip, road signs and the like) in the watching area and outputs watching information based on the pictures.

At roadsides of corners of the intersection, roadside communication units 100a, 100b, 100c and 100d are installed. The roadside communication units 100a, 100b, 100c and 100d have independent communication areas set on the respective roads. The watching information from the road watching apparatus is supplied to the respective roadside communication units 100a, 100b, 100c and 100d and transmitted to the communication areas.

In addition, on each of lanes of the roads intersecting each other, at a position which is a predetermined distance (e.g., 30 meters) away from the entrance of the intersection, a lane marker 101 is installed. The lane marker 101 has a function for emitting information about an approaching direction in which a vehicle passes the lane marker 101 and approaches the intersection and an absolute position of the vehicle passing the lane marker 101. For example, a set of a plurality of magnets may be used as the lane marker 101 (a magnet marker). In this case, various information items can be represented by sets of directions of magnetic poles of the plurality of magnets.

Referring to FIG. 1, a dead angle area Ed for a vehicle V0 which is going to turn right at the intersection is formed by a vehicle V1 approaching from the opposite side to the intersection (to straightly pass through the intersection or turn right at the intersection). A driver of the vehicle V0 cannot watch a vehicle V2 approaching the intersection in the dead angle area Ed. In addition, referring to FIG. 2, a dead angle area Ed for a vehicle V0 which is going to straightly pass through the intersection is formed by a vehicle V1 which is running the same direction of the vehicle V0. The vehicle V1 is at a position in front of the vehicle V0 and close to the opposite lane. In this case also, a driver of the vehicle V0 cannot watch a vehicle V2 standing by for right-turn at the intersection in the dead angel area Ed. In such states, an intersection warning system provided in the vehicle V0 supplies information about vehicles in the respective dead angle areas Ed to the driver and issues a warning based on a relationship between a running state of the vehicle V0 and a running state of the vehicle V2 in each of the dead angle areas Ed.

Figure 3:
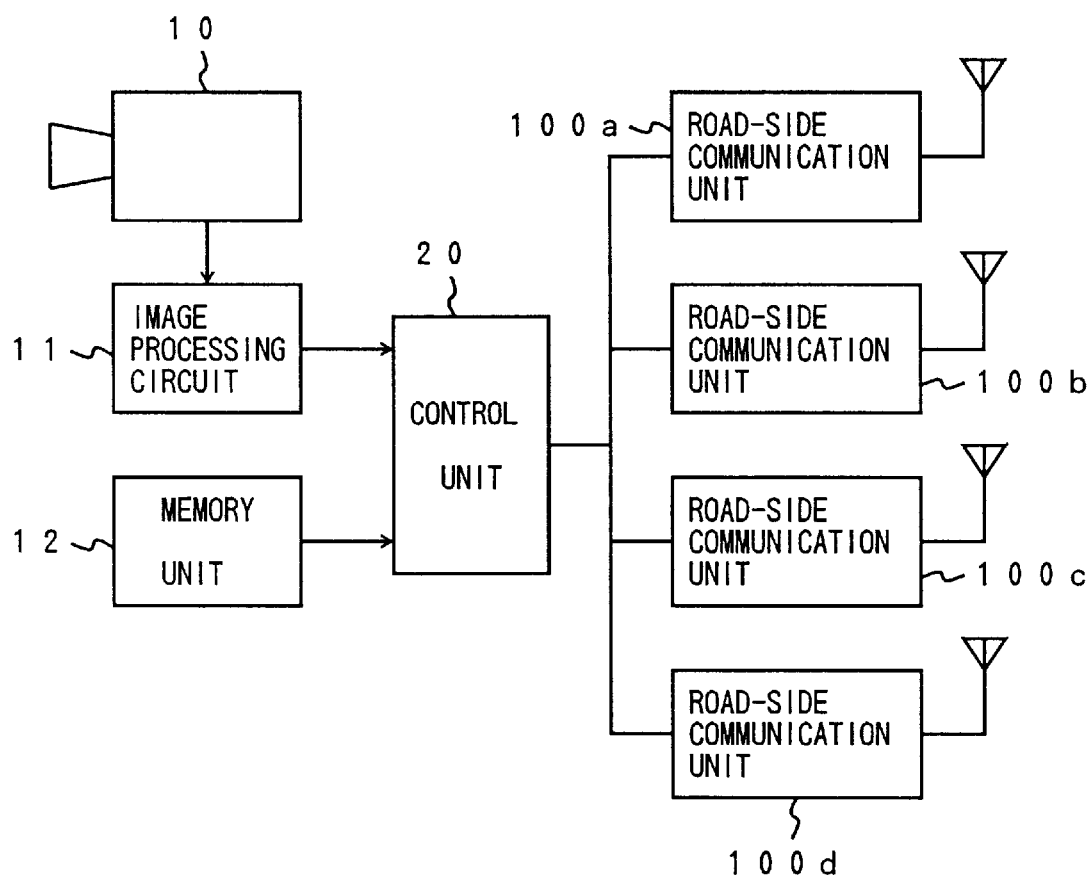
FIG. 3 is a block diagram illustrating a constitution of a system installed at the intersection.

An external system (hereinafter, referred to as a roadside system) including the road watching apparatus and the respective roadside communication units 100a, 100b, 100c and 100d is formed as shown in FIG. 3.

Referring to FIG. 3, the roadside system has a camera 10, an image processing circuit 11, a memory unit 12, a control unit 20 and the roadside communication units 100a, 100b, 100c and 100d. The camera 10, the image processing circuit 11, the memory unit 12 and the control unit 20 are included in the road watching apparatus.

Video signals from the camera 10 are processed by the image processing circuit 11 so that image information of bodies in the watching area Em is generated. The memory unit 12 stores map information. The control unit 20 calculates figure information of the intersection based on the map information read out of the memory unit 12 and positions of the bodies in the watching area Em based on the image information obtained by the image processing unit 11. The figure information of the intersection and the positions of the respective bodies are supplied to the respective roadside communication units 100a, 100b, 100c and 100d. Each of the roadside communication units 100a, 100b, 100c and 100d transmits the position information of the respective bodies and the figure information of the intersection toward a corresponding one of the communication areas as the watching information.

The intersection warning system is mounted in a vehicle (an AHS (Automated Highway System) vehicle). The vehicle having the intersection warning system is referred to, for example, as an intelligent vehicle. While the intelligent vehicle is passing through a communication area of one of the roadside communication units 100a, 100b, 100c and 100d, the intersection warning system receives the watching information from the one of the roadside communication units 100a, 100b, 100c and 100d. The intersection warning system supplies to the driver information about whether there is a vehicle in the dead angle area and a warning.

Figure 4:
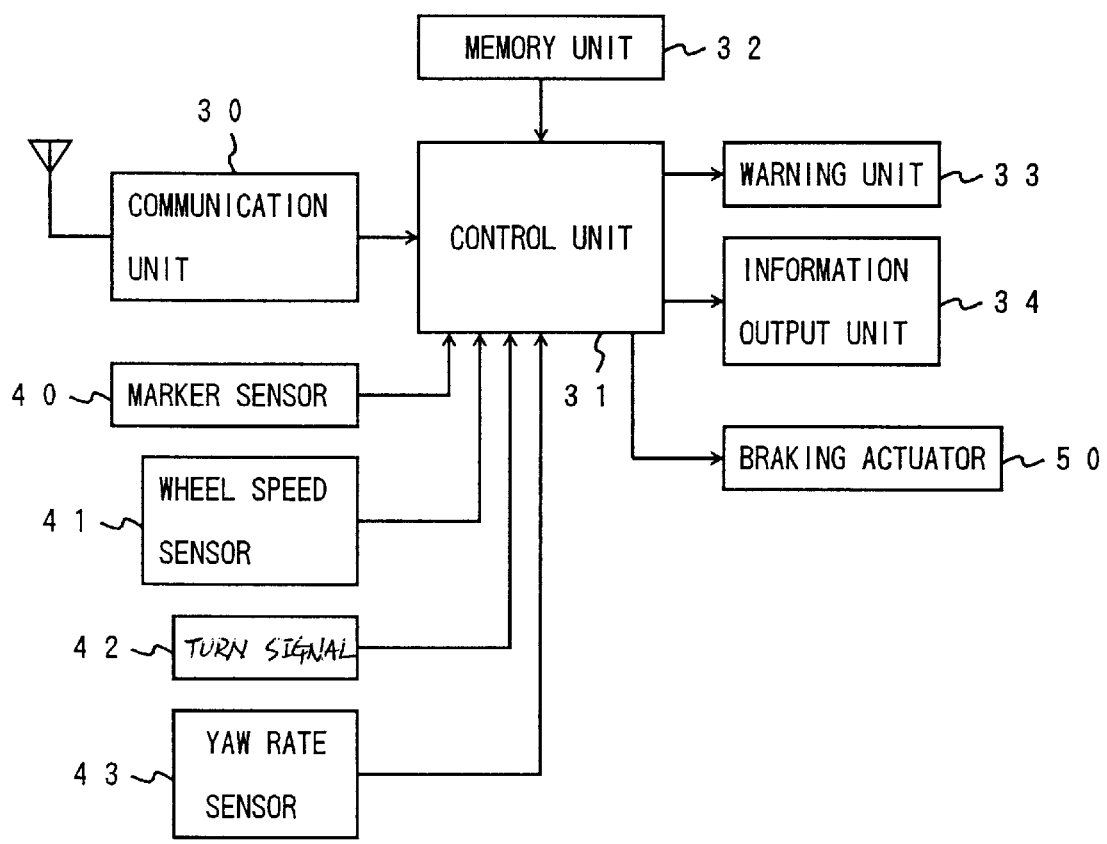
FIG. 4 is a block diagram illustrating an intersection warning system according to an embodiment of the present invention.

The intersection warning system is formed as shown in FIG. 4. Referring to FIG. 4, the intersection warning system has a communication unit 30, a control unit 31, a memory unit 32, a warning unit 33 and information output unit 34. The communication unit 30 carries out data communication with each of the roadside communication units 100a, 100b, 100c and 100d (road-vehicle communication) so as to receive the watching information including the position information of the bodies in the watching area Em. A marker sensor 40 detects information emitted from the lane marker 101. A wheel speed sensor 41 detects a wheel speed and outputs pulses at a rate corresponding to the revolution speed of a wheel of the intelligent vehicle. A direction indicator sensor 42 detects a direction indicated by a direction indicator (a turn signal). A yaw rate sensor 43 detects a variation rate of a yaw angle of the intelligent vehicle. The control unit 31 inputs the watching information received by the communication unit 30, a detecting signal from the marker sensor 40, wheel speed pulses from the wheel speed sensor 41 and detecting signals from the direction indicator sensor 42 and the yaw rate sensor 43. The control unit 31 calculates the dead angle area for the intelligent vehicle, determines whether there is a vehicle in the dead angle area, determines whether there is a possibility of collision of the intelligent vehicle with a vehicle in the dead angle area, and carries out a process for issuing warning information, based on the detecting signals from the respective sensors 40, 41, 42 and 43 and various constants stored in the memory unit 32.

A determination result obtained by the control unit 31 determining whether there is a vehicle in the dead angle area is supplied to the information output unit 34 (which may include a sound output unit, a display unit and the like). The information output unit 34 outputs information about whether there is a vehicle in the dead angle area. In addition, the warning information generated by the control unit 31 is supplied to the warning unit 33, and the warning unit 33 outputs the warning information (a warning sound or a warning message). The control unit 31 further makes a braking control signals for the intelligent vehicle based on the determination result regarding the possibility of the collision with a vehicle. By the braking control signal from the control unit 31, a braking actuator 50 is driven.

Figure 5:
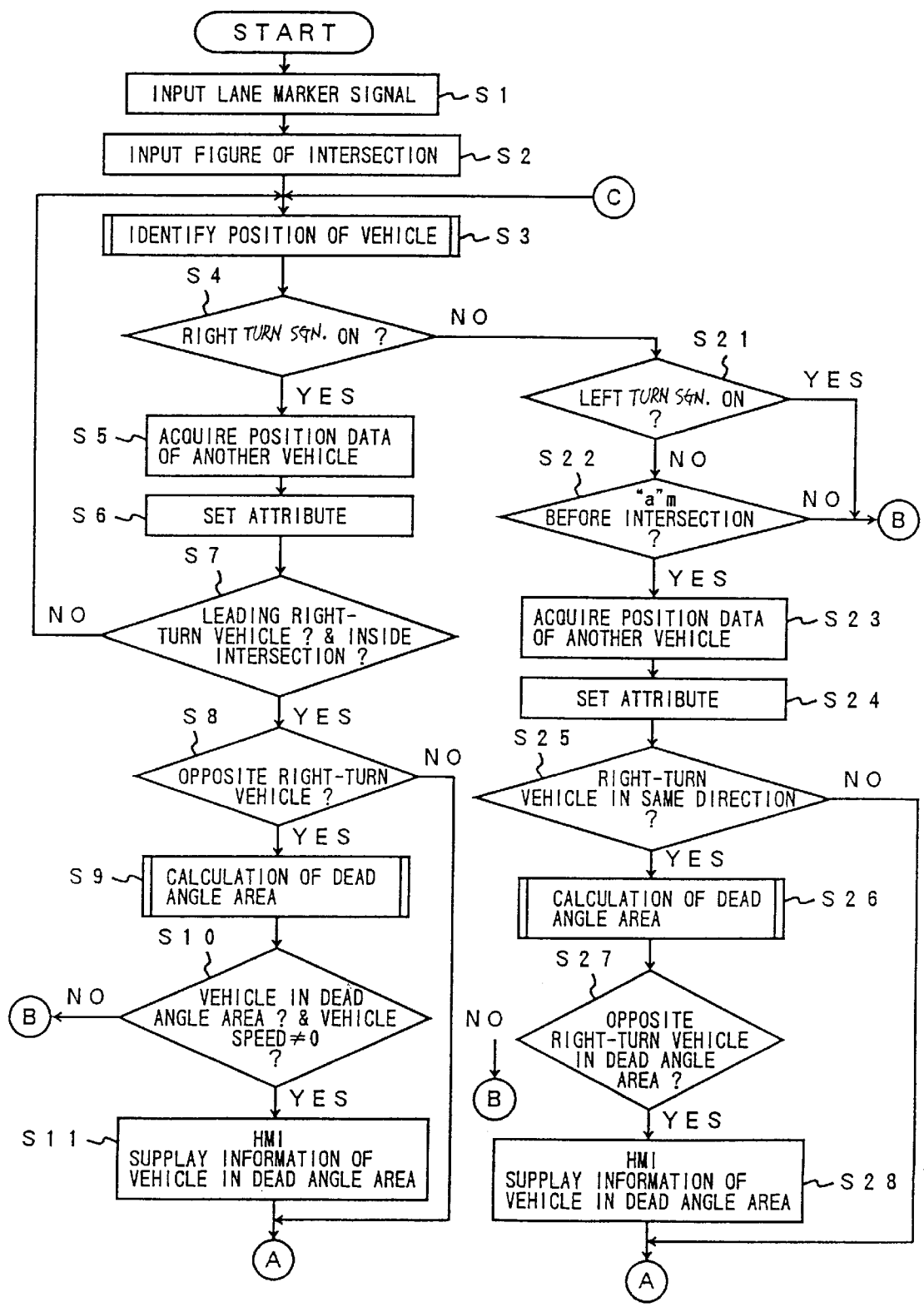
FIG. 5 is a flowchart illustrating a procedure of a process executed by the intersection warning system shown in FIG. 4.
Figure 6:
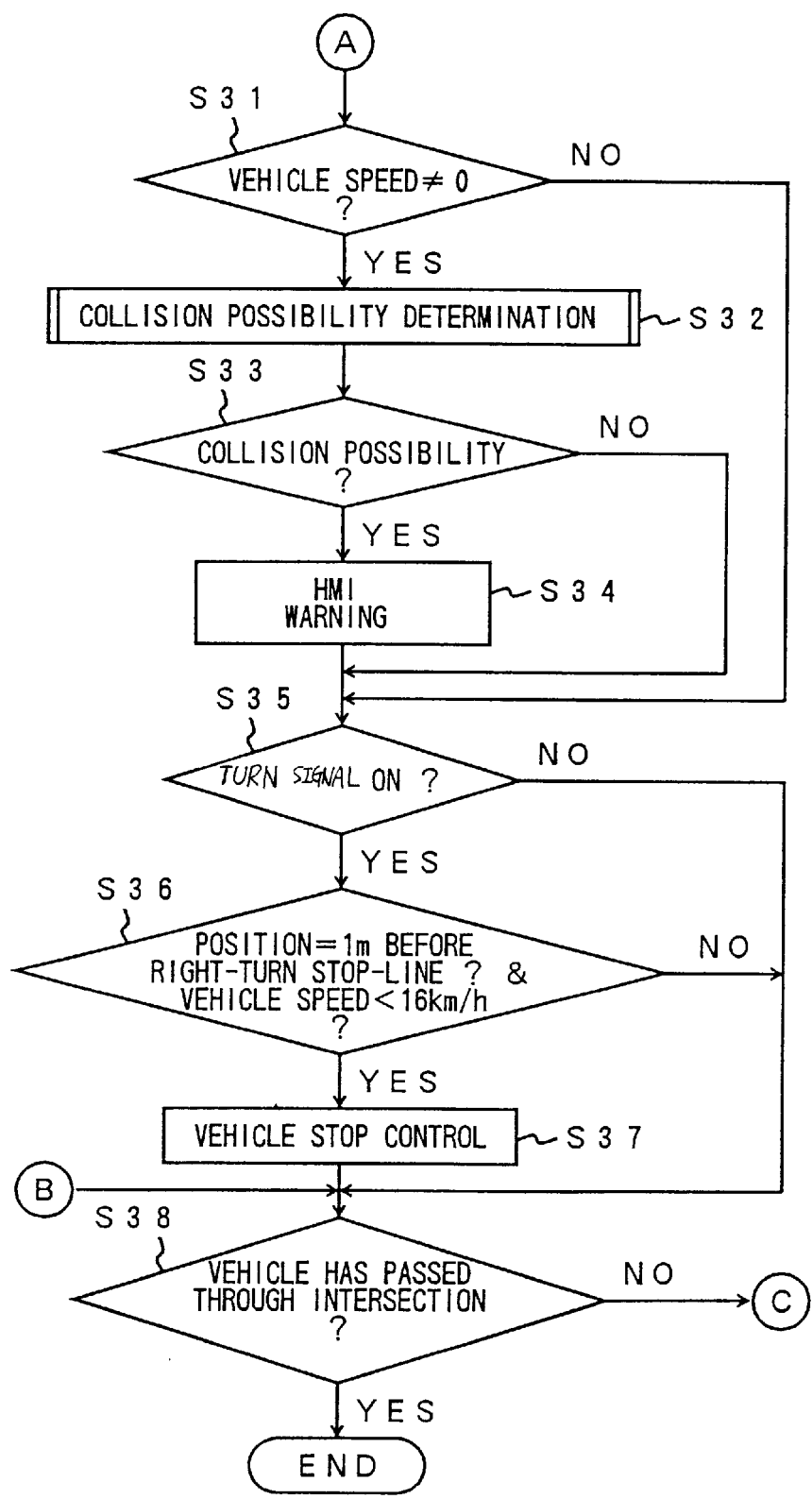
FIG. 6 is a flowchart illustrating a procedure of another process executed by the intersection warning system shown in FIG. 4.

The control unit 31 executes the processes as described above in accordance with procedures as shown in FIGS. 5 and 6.

While the intelligent vehicle is running, the control unit 31 monitors detecting signals from the marker sensor 40. When the intelligent vehicle passes the lane marker 101 installed at the position before the intersection (see FIGS. 1 and 2), the control unit 31 recognizes a position of the lane marker 101 and a direction $\omega_0$ in which the intelligent vehicle is approaching the intersection (S1). The control unit 31 then inputs the figure information of the intersection included in the watching information received by the communication unit 30 in the data communication with a roadside communication unit (one of the roadside communication units 100a, 100b, 100c and 100d) (S2).

Figure 10:
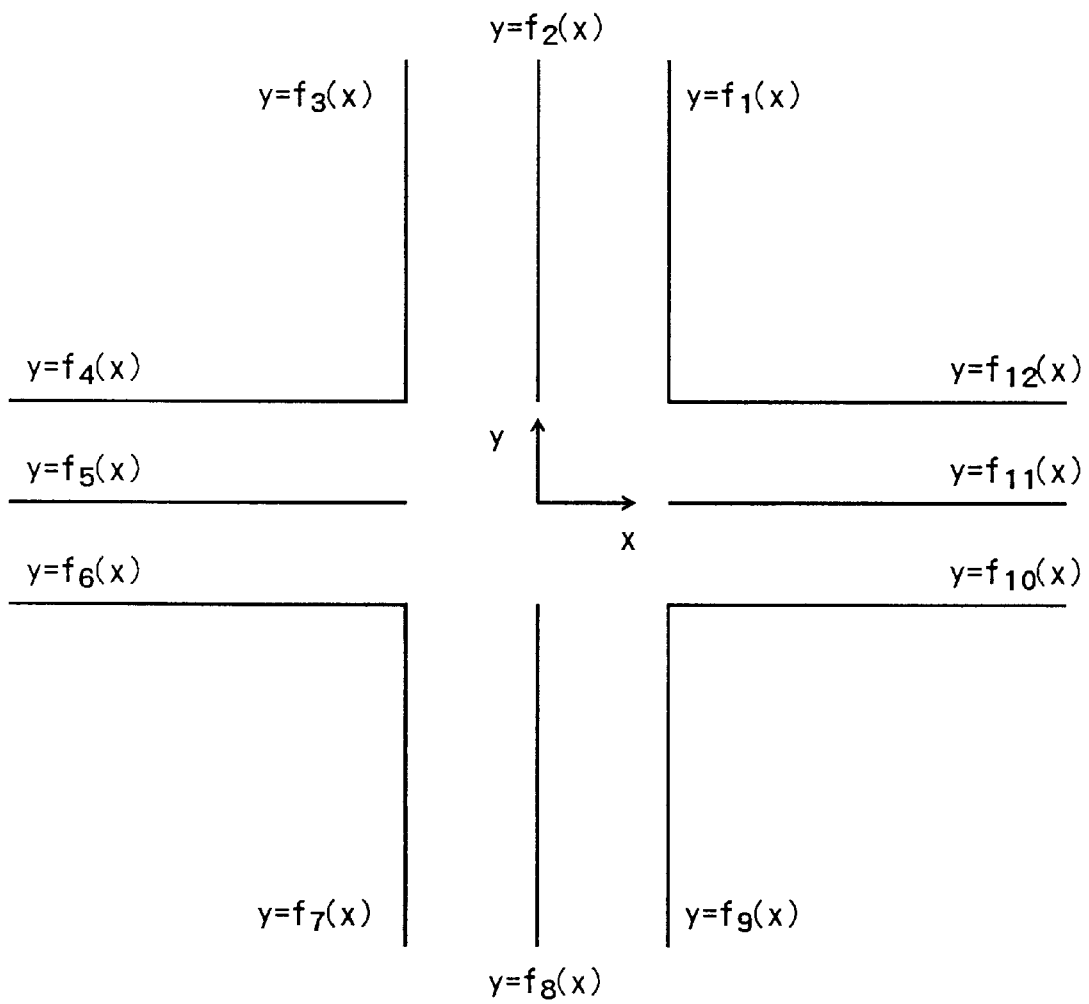
FIG. 10 is a diagram illustrating figure information of the intersection.

The figure information of the intersection is, as shown in FIG. 10, represented by functions ($f_1(x)$–$f_{12}(x)$) of outlines and center lines of the roads intersecting with each other at the intersection, in an x-y coordinate system (set in the control unit 31).

After inputting the figure information of the intersection, the control unit 31 calculates (identifies) a position of the intelligent vehicle based on the position of the lane marker 101 and the detecting signals from the wheel speed sensor 41 and the yaw rate sensor 43 (S3). The calculation of the position of the intelligent vehicle is carried out in accordance with a procedure as shown in FIG. 7.

Figure 7:
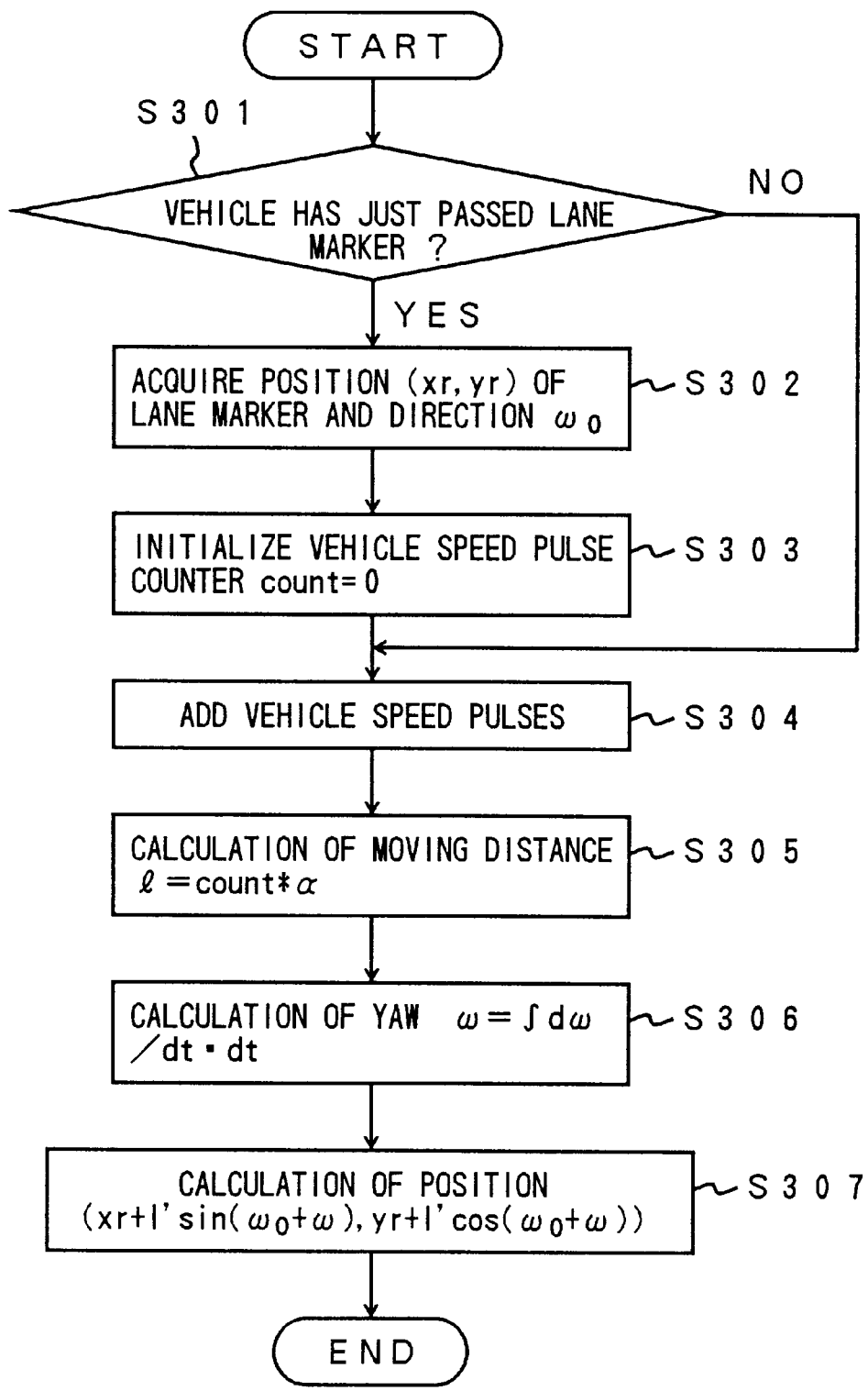
FIG. 7 is a flowchart illustrating a procedure of a process for calculating a position of a vehicle.

Referring to FIG. 7, when it is determined that the intelligent vehicle has just passed the lane marker 101 (YES in step S301), a position ($x_r$, $y_r$) of the lane marker 101 and the approaching direction $\omega_0$ of the intelligent vehicle are acquired (S302). The count value (count) of a wheel speed pulse counter is initialized (count=0) (S303). After the count value of the wheel speed pulse counter is initialized, the wheel speed pulse counter starts an adding operation of the wheel speed pulses (S304). The count value (count) of the wheel speed pulses corresponds to the distance I by which the intelligent vehicle moves (a running distance). The distance I is calculated in accordance with the following equation (S305).

$$I = count * \alpha$$

In the above equation, $\alpha$ is a proportional constant.

A yaw angle $\omega$ of the intelligent vehicle is calculated based on the detecting signal from the yaw rate sensor 43 (S306). That is, the yaw rate ($d\omega/dt$) detected by the yaw rate sensor 43 is integrated so that the yaw angle $\omega$ is calculated ($\omega = \int d\omega/dt$). Based on the detected position ($x_r$, $y_r$) of the lane marker 101, the approaching direction $\omega 0$ of the intelligent vehicle, the running distance I from the detected position ($x_r$, $y_r$) and the yaw angle $\omega$ all of which are calculated as described above, the position ($x_1$, $y_1$) of the intelligent vehicle is calculated in accordance with the following equations (S307).

$$x_1 = x_r + I' \sin(\omega_0 + \omega)$$

$$y_1 = y_r + I' \cos(\omega_0 + \omega)$$

Figure 11:
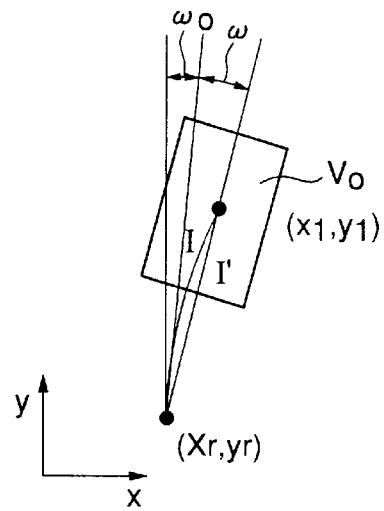
FIG. 11 is a diagram illustrating how to calculate a position of a vehicle.

The relationships between the approaching direction $\omega_0$, the position $(x_r, y_r)$ of the lane marker 101, the position $(x_1, y_1)$ of the intelligent vehicle V0 and the running distance I are shown in FIG. 11. In the above equations, I' is the distance in a straight line between the position $(x_r, y_r)$ of the lane marker 101 and the position $(x_1, y_1)$ of the vehicle V0. In fact, the running distance I as calculated above is substituted for the distance I' in a straight line between the above points.

The calculation of the position of the vehicle is repeatedly carried out at predetermined intervals until it is determined that the vehicle has passed through the intersection. In the calculation process repeatedly carried out, the steps S302 and S303 (the processes of acquiring the position of the lane marker and initializing the wheel speed pulse counter) are skipped.

Returning to FIG. 5, after the position of intelligent the vehicle is calculated as described above, the control unit 31 determines, based on the detecting signal from the direction indicator sensor 42, whether a direction indicating operation of turning to the right (a right turn operation) is carried out (S4). When such a direction indicating operation is carried out, the control unit 31 acquires position information (coordinate values), running directions ($\omega$ and size information (the width and the length) of other vehicles in the watching area Em included in the watching information received by the communication unit 30 (S5). Attributes of the other vehicles in the watching area Em are then set (S6). Examples of the attributes of the vehicles will be described below.

In a case where the road has a single lane in one side, a "right-turn vehicle" is set as the attribute for a vehicle which stops near the center line of the road at the intersection. In a case where the road has a plurality of lanes in one side and there is no exclusive lane used to turn right, the "right-turn vehicle" is set as the attribute for a vehicle which stops in a lane adjacent to the center line. In addition, in a case where the road has a plurality of lanes in one side and there is an exclusive lane used to turn right, the "right-turn vehicle" is set as the attribute for a vehicle which stops in the exclusive lane used to turn right. A "straightly-running vehicle or left-turn vehicle" is set as the attribute for vehicles other than the above types of vehicles in the watching area Em.

The control unit 31 further determines, based on the position of the intelligent vehicle calculated as described above and the figure information of the intersection (see FIG. 10), whether the intelligent vehicle is in the intersection as a leading vehicle to turn right at the intersection (S7). If the intelligent vehicle has not yet been in the intersection as the leading vehicle to turn right, the calculation of the position of the intelligent vehicle (S3), the determination of the direction indicating operation (S4), the acquisition of the watching information of the other vehicles in the watching area Em (S5) and the setting of the attributes for the other vehicles in the watching area Em (S6) are repeatedly carried out. On the other hand, if it is determined that the intelligent vehicle is in the intersection as the leading vehicle to turn right, the control unit 31 determines, with reference to attributes of the other vehicles in the watching area Em and the watching information (including the position information), whether there is a right-turn vehicle in the opposite lane (S8).

If it is determined that there is a right-turn vehicle in the opposite lane, for example, the intelligent vehicle V0 and the right-turn vehicle V1 face each other in the intersection as shown in FIG. 1. In this case, the control unit 31 calculates the dead angle area Ed for the intelligent vehicle V0 formed by the right-turn vehicle V1 (S9). The calculation of the dead angle area Ed is carried out in accordance with a procedure as shown in FIG. 8.

Figure 8:
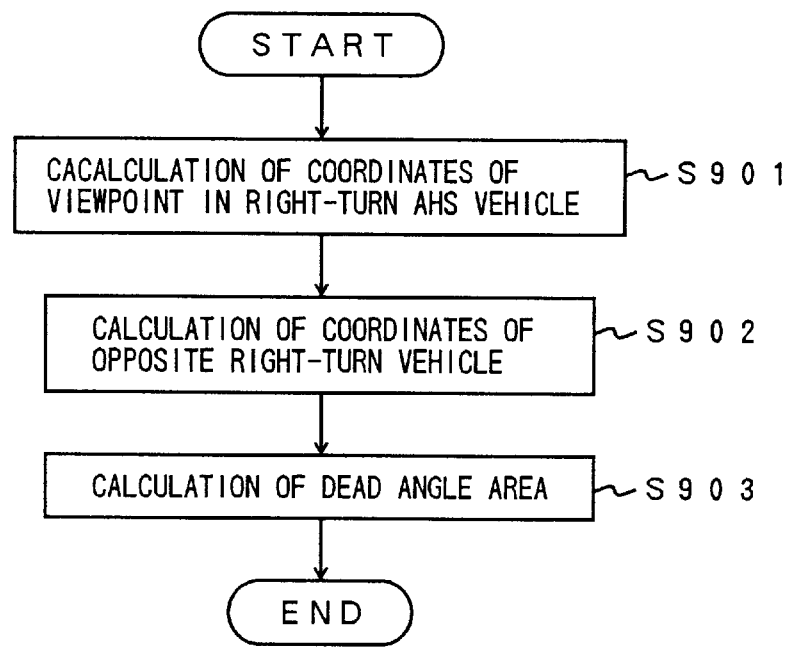
FIG. 8 is a flowchart illustrating a procedure of a process for calculating a dead angle area.
Figure 12:
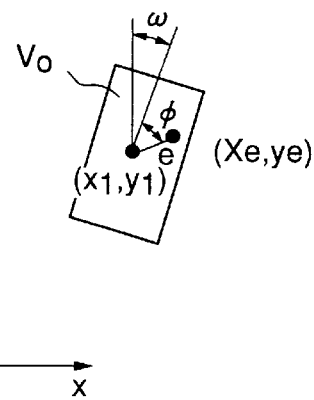
FIG. 12 is a diagram illustrating how to calculate a position of a driver.

Referring to FIG. 8, coordinates of a position (an eye-point) of a driver of the intelligent vehicle V0 (the AHS vehicle) which is going to turn right at the intersection are calculated (S901). The coordinates $(x_e, y_e)$ of the position of the driver of the intelligent vehicle V0 are calculated, using, as shown in FIG. 12, the distance e between the position $(x_e, y_e)$ of the driver and the position $(x_1, Y_1)$ of the origin of the intelligent vehicle V0 and an angle $\phi$ between a line connecting the positions of driver and origin of the intelligent vehicle v0 and an axis of the intelligent vehicle V0, in accordance with the following equations.

$$x_e = x_1 + e \cdot \sin(\omega + \phi)$$

$$y_e = y_1 + e \cdot \cos(\omega + \phi)$$

The distance e and the angle $\phi$ are set at fixed values for every vehicle (in the memory unit 32).

Figure 13:
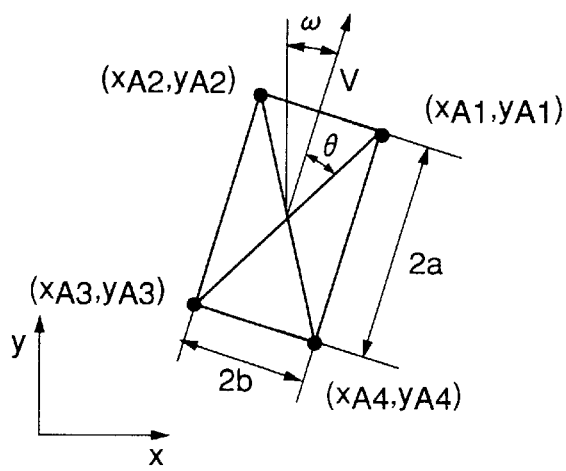
FIG. 13 is a diagram illustrating how to calculate coordinates of various points of a vehicle.

After the position (the eye-point) $(x_e, y_e)$ of the driver of the intelligent vehicle is calculated, the control unit 31 calculates position coordinates of the right-turn vehicle in the opposite lane (an opposite right-turn vehicle)(S902). In the calculation, as shown in FIG. 13, using the position information (coordinates $(x_{A0}, y_{A0})$ of the center), the length $2a$ and the width $2b$ of the opposite right-turn vehicle, coordinates $(x_{A1}, y_{A1})$, $(x_{A2}, y_{A2})$, $(x_{A3}, y_{A3})$ and $(x_{A4}, y_{A4})$ of four corner points of the opposite right-turn vehicle are calculated in accordance with the following equations.

$$(xA1, yA1) = (xA0 + A \sin(\phi + \omega), yA0 + A \cos(\phi + \omega))$$

$$(xA2, yA2) = (xA0 - A \sin(\phi - \omega), yA0 + A \cos(\phi - \omega))$$

$$(xA3, yA3) = (xA0 - A \sin(\phi + \omega), yA0 + A \cos(\phi + \omega))$$

$$(xA4, yA4) = (xA0 + A \sin(\phi - \omega), yA0 - A \cos(\phi - \omega))$$

In a case where there are a plurality of opposite right-turn vehicles in the watching area Em, the above coordinates are calculated for every opposite right-turn vehicle.

Figure 14:
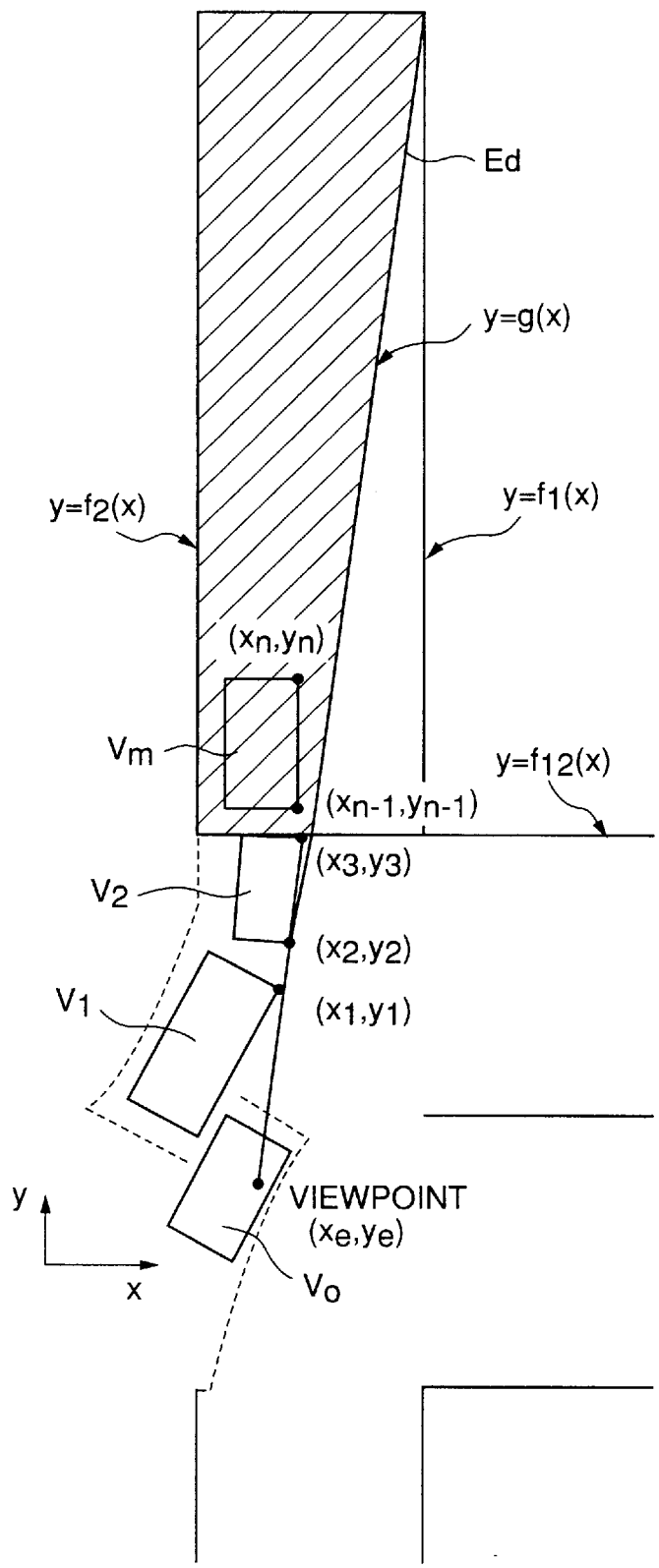
FIG. 14 is a diagram illustrating a dead angle area, for an vehicle turning right an intersection, formed by another vehicle approaching from the opposite side and turning right at the intersection.

After the coordinates of side end points (belonging to the corner points) of the opposite right-turn vehicle are calculated as described above, the dead angle area Ed for the intelligent vehicle formed by the opposite right-turn vehicle is calculated based on the position (the eye-point) $(x_e, y_e)$ of the driver of the intelligent vehicle, the side end points $(x_n, y_n)$ of the opposite right-turn vehicle and the figure information of the intersection (S903). For example, as shown in FIG. 14, in a case where there are a plurality of opposite right-turn vehicles V1, V2, ..., Vm with respect to the intelligent vehicle V0, lines connecting the position $(X_e, y_e)$ of the driver of the intelligent vehicle V0 and the side end points $(x_1, y_1), (x_2, y_2), \ldots, (x_{n-1}, y_{n-1}), (x_n, y_n)$ of the respective opposite right-turn vehicles are calculated. The widest area out of areas into which an area on the road is partitioned by the lines $y = f_1(x)$, $y = f_2(x)$, ..., $y = f_{12}(x)$ (corresponding to the figure of the intersection shown in FIG. 10) representing the figure of the intersection and the lines connecting the position of the driver and the side end points of the respective opposite right-turn vehicles is decided as the dead angle area Ed.

In the example shown in FIG. 14, an area surrounded by a line $y = g(x)$ connecting the position of the driver of the intelligent vehicle V0 and the side end point ($x_2$, $y_2$) of the opposite right-turn vehicle V2 and the lines $y=f_2(x)$ and $y=f_{12}(x)$ representing a part of the figure of the intersection is the widest area. Thus, the dead angle area Ed is defined by the lines $y=g(x)$, $y=f_2(x)$ and $y=f_{12}(x)$.

Returning to FIG. 5, after the dead angle area Ed is calculated as described above (S9), the control unit 31 determines, based on the watching information received by the communication unit 30, whether there is a vehicle running in the dead angle area Ed (S10). For example, in a case where, as shown in FIG. 1, there is the vehicle V2 approaching the intersection from the opposite side in the dead angle area Ed, the control unit 31 supplies information indicating that there is the vehicle V2 in the dead angle area Ed to the information output unit 34 (S11). As a result, the information output unit 34 outputs, for example, a voice message to the effect that there is a vehicle approaching the intersection in the dead angle area Ed. The driver hears the voice message and recognizes that there is a vehicle approaching the intersection in the dead angle area Ed. The driver then drives the intelligent vehicle V0 to turn right at the intersection, paying attention to another vehicle in the dead angle area Ed.

On the other hand, if there is no vehicle in the dead angle area Ed (No in step S10), the message is not output and it is determined whether the intelligent vehicle has passed through out the intersection (S38 in FIG. 6). The process as described above (S3–S10) is then executed again. Until the intelligent vehicle completely turns right at the intersection and passes through out the intersection, the above process is repeatedly carried out. In addition, in a case where there is no opposite right-turn vehicle when the intelligent vehicle is going to turn right at the intersection (No in step S8), the calculation of the dead angle area Ed is not carried out and the process shown in FIG. 6 stars.

On the other hand, when it is determined, in step S4, that the direction indicating operation to turn right is not carried out, the control unit 31 determines, based on the detecting signal from the direction indicator sensor 42, whether the direction indicating operation to turn left is carried out (S21). If the direction indicating operation to turn left is not carried out, it is further determined, based on the calculated position of the intelligent vehicle (obtained in step S3), whether the intelligent vehicle reaches a position "a" meters (the distance set at a predetermined value) before the intersection (S22). If the intelligent vehicle has not yet reached the position, the determination whether the vehicle has passed through out the intersection (S38 in FIG. 6), the calculation of the position of the intelligent vehicle (S3) and the determination of the direction indicating operation (S4, S21 and S22) are repeatedly carried out.

When it is determined that the intelligent vehicle has reached the position "a" meters before the intersection without any direction indicating operation, the control unit 31 recognizes that the intelligent vehicle is going to straightly pass through the intersection. In this case, as shown in FIG. 2, if there is another vehicle V1 which is put in the same direction as the intelligent vehicle V0 at a position in front of the intelligent vehicle V0 and close to the opposite lane, the driver of the intelligent vehicle V0 has to pay attention to an opposite right-turn vehicle V2 in the dead angle area Ed for the intelligent vehicle V0 formed by the other vehicle V1.

In this situation, the control unit 31 acquires the position information of other vehicles in the watching area Em included in the watching information received by the communication unit (S23) and sets the attribute (the right-turn vehicle or another kind of vehicle) for each of the other vehicles (S24) in the same manner as in steps S5 and S6 described above. After this, the control unit 31 determines, based on the position information and attributes of the other vehicles, whether there is a vehicle (a right-turn vehicle) which is put in the same direction as the intelligent vehicle V0 and going to turn right at the intersection.

If there is such a vehicle (e.g. as a vehicle V1 shown in FIG. 2), the control unit 31 calculates a dead angle area Ed formed by the right-turn vehicle (S26). The calculation of the dead angle area Ed is carried out in the same procedure as that shown in FIG. 8. That is, a position ($x_e$, $y_e$) (an eye-point) of the driver is calculated based on the position data of the intelligent vehicle V0 and predetermined position data (e and ϕ) (see FIG. 12), coordinates of four corner points of the right-turn vehicle are calculated (see FIG. 13), and the side end points of the right-turn vehicle are calculated. Further, based on lines connecting the position (the eye-point) of the driver and the side end points of the right-turn vehicle and the figure information of the intersection, the dead angle area Ed for the intelligent vehicle V0 formed by the right-turn vehicle put in the same direction as the intelligent vehicle V0 is calculated.

Figure 15:
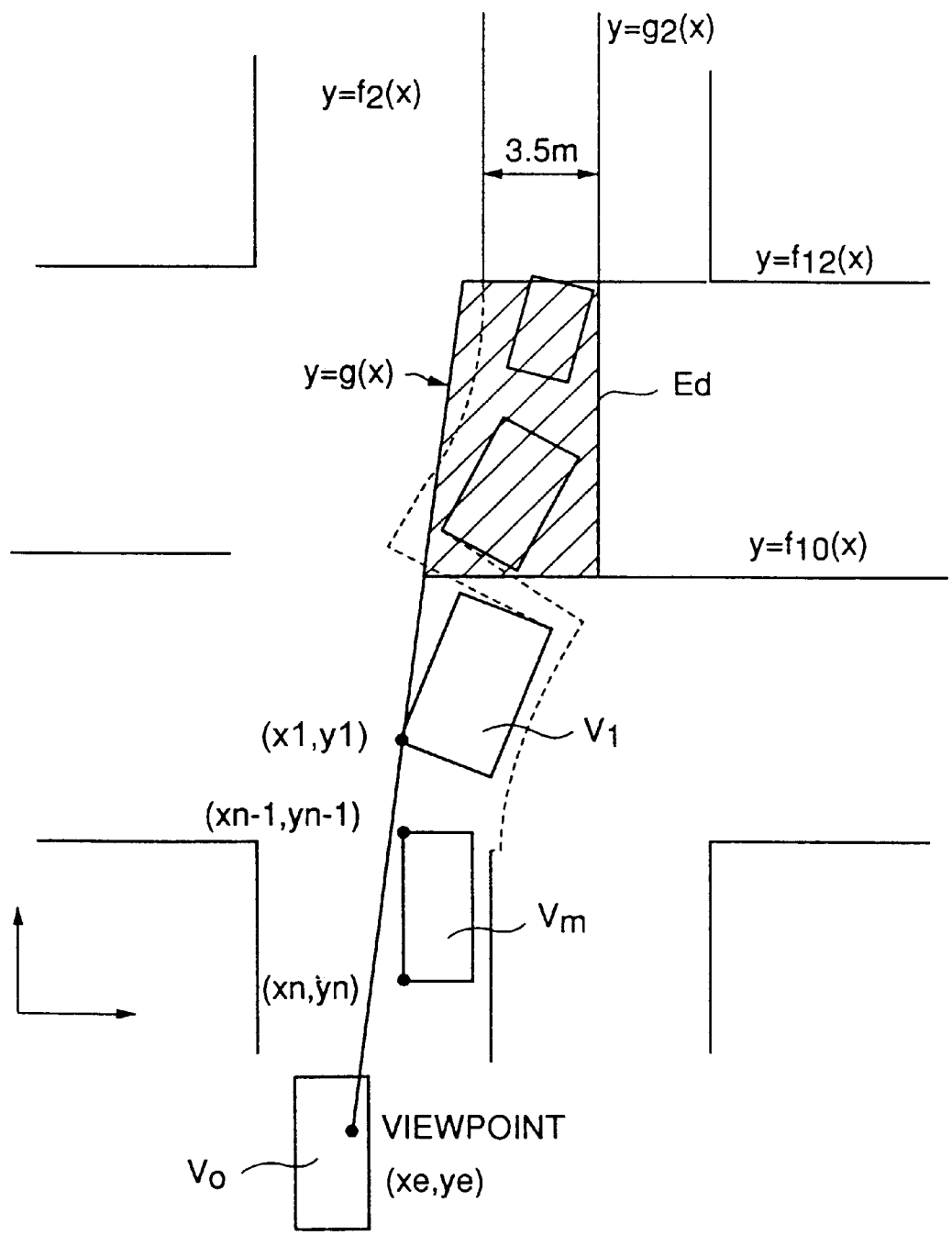
FIG. 15 is a diagram illustrating a dead angle area, for a vehicle approaching an intersection, formed by another vehicle positioned in a forward opposite-lane side area of the vehicle.

For example, as shown in FIG. 15, in a case where there are a plurality of right-turn vehicles V1, . . . , Vm put in the same direction as the intelligent vehicle V0, the widest area out of areas surrounding the lines connecting the side end points (x1, y1,), . . . , (xn−1, yn−1) of the right-turn vehicles V1, . . . , Vm and the position ($x_e$, $y_e$) of the driver of the intelligent vehicle V0, the lines $y=f_{10}(x)$ and $y=f_{12}(x)$ representing the figure of the intersection and a line $y=g2(x)$ away from the center line $y=f_2(x)$ of the road by a predetermined length (e.g., 3.5 meters) is decided as the dead angle area Ed. In this example shown in FIG. 15, an area surrounding a line $y=g(x)$ connecting the position ($x_e$, $y_e$) of the driver of the intelligent vehicle V0 and the side end point ($x_1$, $y_1$) of the right-turn vehicle V1, the lines $y=f_{10}(x)$ and $y=f_{12}(x)$ and the line $y=g2(x)$ is the widest area. Thus, the dead angle area Ed is defined by the lines $y=g(x)$, $y=g2(x)$, $y=f_{10}(x)$ and $y=f_{12}(x)$.

As has described above, the driver of the intelligent vehicle which is going to straightly pass through the intersection has to pay attention to opposite right-turn vehicles (such as the vehicle V2 shown in FIG. 2) in the dead angle area Ed formed by the right-turn vehicle put in the same direction as the intelligent vehicle V0. In this case, an area, close to the center line, in which there may be an opposite right-turn vehicle may be taken into account. Thus, in the example shown in FIG. 15, the dead angle area Ed is defined using the line $y=g2(x)$ away from the center line of the road by the predetermined length.

After the dead angle area Ed is calculated as described above, the control unit 31 determines, based on the watching information, whether there is an opposite right-turn vehicle in the dead angle area Ed (S27). For example, as shown in FIG. 2, in a case where there is an opposite right-turn vehicle V2 in the dead angle area Ed, the control unit 31 supplies the information indicating that there is an opposite right-turn vehicle in the dead angle area Ed to the information output unit 34 (S28). The information output unit 34 outputs a message to the effect that there is an opposite right-turn vehicle in the dead angle area Ed. Due to the message, the driver recognizes that there is an opposite right-turn vehicle in the dead angle area formed by the right-turn vehicle at a position close to the opposite lane in front of the intelligent vehicle V0. The driver then carries out driving operations with paying attention to the opposite right-turn vehicle.

On the other hand, if there is no opposite right-turn vehicle in the dead angle area Ed (No in Step S27), the message is not output and it is then determined whether the intelligent vehicle V0 has passed through out the intersection (S38 in FIG. 6). After this, the process starting from the calculation of the position of the intelligent vehicle V0 (S3) is repeatedly executed. In addition, there is not right-turn vehicle put in the same direction as the intelligent vehicle V0 (No in S25), the process proceeds to steps shown in FIG. 6 without calculation of the dead angle area Ed.

Furthermore, when the control unit 31 of the intelligent vehicle approaching the intersection determines, based on the detecting signal from the direction indicator sensor, that the direction indicating operation to turn left is carried out (YES in S21), the intelligent vehicle in which the position thereof is being calculated is passing through the intersection (S3, S21 and S38).

In the intersection warning system as described above, when the intelligent vehicle is going to pass through the intersection, a dead angle area formed by another vehicle is calculated based on the watching information transmitted from the road watching apparatus and information about other vehicles in the dead angle area is supplied to the driver. When the intelligent vehicle passes through the intersection, it is determined whether, in accordance with a procedure shown in FIG. 6, whether the driving operation is appropriate for conditions in the intersection. If the driving operation is not appropriate for the conditions in the intersection, a warning is issued and a compulsorily braking control is then executed. A description will now be given of the procedure.

Referring to FIG. 6, the control unit 31 determines, based on the wheel speed pulses from the wheel speed sensor 41, whether the intelligent vehicle is running (turning to the right or straightly running) (S31). In a case where the driving operations (the steering operation and/or the accelerating operation) is carried out (the vehicle is running) to pass through the intersection, the control unit 31 carries out a collision determination process for determining whether there is a possibility of collision between the intelligent vehicle and another vehicle in the dead angle area (S32). The collision determination process is carried out in accordance with a procedure shown in FIG. 9.

Figure 9:
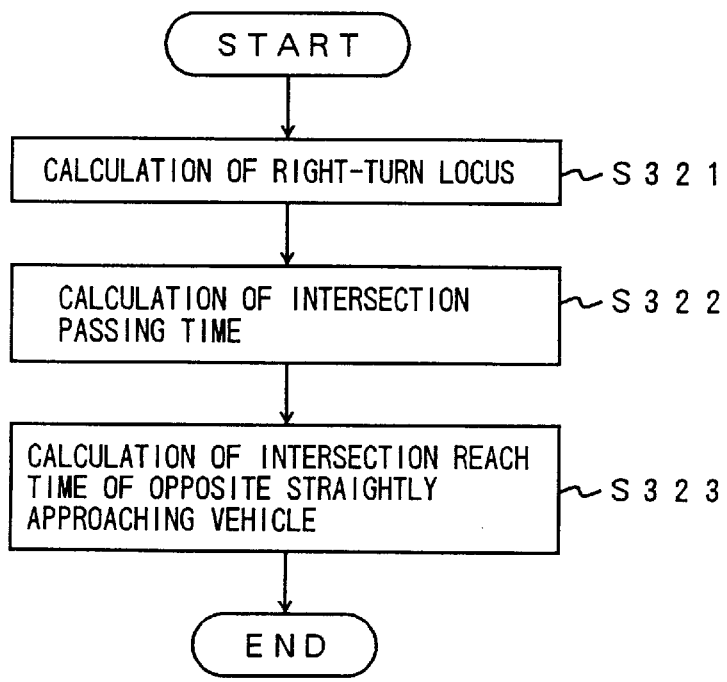
FIG. 9 is a flowchart illustrating a procedure of a process for determining possibility of collision.
Figure 16:
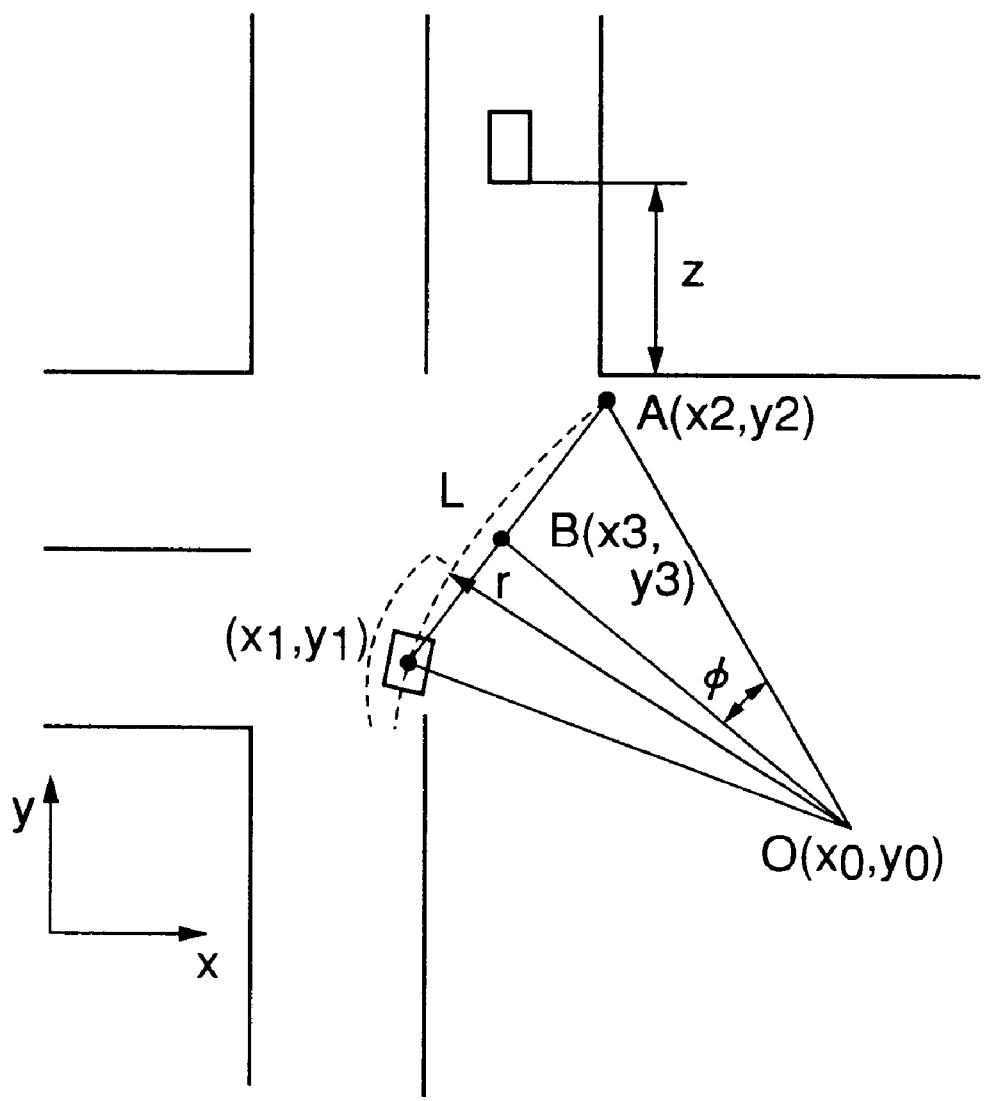
FIG. 16 is a diagram illustrating a diagram illustrating a locus of a vehicle turning right at an intersection.

The road watching apparatus has a typical value of a radius (r) of curvature of a locus along which a vehicle turns right at the intersection (see FIG. 16). Further, coordinates $(x_0, y_0)$ of the center O of curvature of the locus and coordinates $(x_2, y_2)$ of a point A at which the vehicle completely turns right at the intersection are stored in the road watching apparatus (see FIG. 16). Such kinds of data from the road watching apparatus transmitted from the road watching apparatus are input to the control unit 31 through the communication unit 30. Referring to FIG. 9, when the intelligent vehicle V0 is going to turn right at the intersection (in cases shown in FIGS. 1 and 14), the control unit 31 calculates, based on the input data, a locus along which the intelligent vehicle V0 turns right at the intersection (S321). This calculation is carried out as follows.

As shown in FIG. 16, the middle point B $(x_3, y_3)$ between the position $(x_1, y_1)$ of the intelligent vehicle V0 (obtained in S3 shown in FIG. 5) and the point A $(x_2, y_2)$ at which the intelligent vehicle V0 completely turns right is calculated in accordance with the following equation.

$(x_3, y_3) = ((x_1+x_2)/2, (y_1+y_2)/2)$

The length $|AB|$ of a segment AB is then calculated as follows.

$|AB| = \{(x_3-x_2)^2 + (y_3-y_2)^2\}^{1/2}$

An angle φ between the middle point B and the point A with respect to the center O is calculated in accordance with the following equation.

$\phi = \sin^{-1}(|AB|/r)$

The length L from a position of the intelligent vehicle to the point A at which the intelligent vehicle completely turns right and passes through out the intersection is then calculated.

$L = r \cdot 2 \cdot \phi$

The control unit 31 obtains the length data L as the calculation result of the locus along which the intelligent vehicle turns right.

After the calculation of the locus along which the intelligent vehicle turns right is completed, the control unit 31 calculates a time period (an intersection passing time t) for which the intelligent vehicle turns right and passes through out the intersection (S322). The intersection passing time t is calculated, for example, in accordance with the following equation.

$t = [-v_0 + \{v_0^2 - 2 \cdot (L+L_0) \cdot a\}^{1/2}]/a$

In the above equation, v0 is a velocity, L0 is the half length of a vehicle and a is the acceleration all of which are set for each vehicle.

Further, the control unit 31 calculates a time period (an intersection reach time $t_r$) which is required for an approaching vehicle (the vehicle V2 shown in FIG. 1) from the opposite side in the dead angle area to reach the intersection. The intersection reach time $t_r$ is calculated as follows.

$t_r = [-v_{r0} + \{v_{r0}^2 - 2 \cdot Z \cdot a_t\}^{1/2}]/a_t$

In the above equation, $v_{r0}$ is the velocity of the approaching vehicle, Z is the distance between the present position of he approaching vehicle and the intersection and $a_t$ is the acceleration of the approaching vehicle.

The control unit 31 then calculates the difference $(t-t_r)$ between the intersection passing time t of the intelligent vehicle and the intersection reach time $t_r$ of the approaching vehicle. The difference $(t-t_r)$ is obtained as the determination result of the collision possibility between the intelligent vehicle and the approaching vehicle.

Returning to FIG. 6, after the collision determination process is completed, the control unit 31 determines, based on the sign (plus or minus) of the difference $(t-t_r)$, whether there is a possibility of collision between the intelligent vehicle and the approaching vehicle from the opposite side if the intelligent vehicle is maintained in the present running state (S33). If the difference $(t-t_r)$ is a positive value (has the plus sign), it is assumed that the approaching vehicle from the opposite side reaches the intersection before the intelligent vehicle completely turns right and passes through out the intersection. Thus, it is determined that there is a possibility of the collision between the intelligent vehicle and the approaching vehicle from the opposite side. In this case, since the driving operation of the driver is not appropriate for the conditions in the intersection, the control unit 31 supplies a warning signal to the warning unit 34 (S34). As a result, the warning unit 34 outputs a warning sound and a warning message.

The driver hearing the warning sound and/or reading the warning message recognizes that the driving operation is not appropriate for the conditions in the intersection. Thus, the driver pays attention to the approaching vehicle from the opposite side and corrects the driving operation.

On the other hand, if the difference $(t-t_r)$ is a negative value (has the minus sign), it is assumed that the approaching vehicle from the opposite side reaches the intersection after the intelligent vehicle completely turns right and passes through out the intersection. Thus, it is determined that there is no possibility of the collision between the intelligent vehicle and the approaching vehicle from the opposite side. In this case, the control unit 31 does not output the warning signal.

In a case where the vehicle is standing by for right-turn at the intersection (No in S31), the collision determination process (S32), the process for determining the collision possibility (S33) and the process for outputting of the waning signal (S34) are not executed.

In the above description, the respective processes are carried out when the vehicle is going to turn right. In addition, in a case where the intelligent vehicle is going to straightly pass through the intersection (such as the cases shown in FIG. 2 and FIG. 15), substantially the same processes as in the above case are executed.

That is, in the collision determination process (S32), a locus along which an opposite right-turn vehicle (such as the vehicle V2 shown in FIG. 2) turns right at the intersection is calculated. The length L by which the opposite right-turn vehicle is running until the opposite right-turn vehicle passes through out the intersection is then obtained. The intersection passing time t for the opposite right-turn vehicle is calculated based on the length L in the same manner as in the above case. A time period (the intersection reach time $t_r$) which is required for the intelligent vehicle straightly approaching the intersection to reach the intersection is calculated in the same manner as in the above case. It is determined, based on the difference $(t-t_r)$ between the times, whether there is a possibility of the collision between the intelligent vehicle straightly approaching the intersection and the opposite right-turn vehicle. As a result, if it is determined that there is a possibility of the collision, the warning (the warning sound and/or the warning message) is issued by the warning unit 34.

As has been described above, if it is determined that the driving operation is not appropriate to pass through the intersection (there is a possibility of collision against a vehicle from the opposite side), the warning unit 34 issues a warning. Particularly, in a case where although a warning is issued in a vehicle which is going to turn right at the intersection, the driving operation is not corrected, the braking control is carried out in accordance with the following procedure. In FIG. 6, after the process for issuance as the warning as described above is completed, the control unit 31 determines, based on the detecting signal from the direction indicator sensor 42, whether the direction indicating operation is carried out (S35). When the vehicle is going to turn right, the direction indicating operation to turn right is carried out (YES in S35). Thus, the control unit 31 determines, based on the calculated position of the intelligent vehicle, whether the intelligent vehicle has reached a position one meter before a right-turn stop-line at the intersection (S36). The control unit 31 further determines whether the vehicle speed is equal to or less than a predetermined value (e.g., 16 km/h) (S36). A case where the vehicle speed is equal to or less than the predetermined value (e.g., 16 km/h) at the position one meter before the right-turn stop-line corresponds to neither a case where the driver confirms that there is no vehicle straightly approaching the intersection from the opposite side and drives the intelligent vehicle to turn right at a dash nor a case where the intelligent vehicle stops at the intersection to stand by for right-turn due to existence of a vehicle straightly approaching the intersection from the opposite side. In this case, it is determined that it is dangerous to maintain the driving operation to turn right at the intersection. Thus, the control unit 31 supplies a braking control signal to the braking actuator 50 (S37). As a result, the braking actuator 50 is driven so that the intelligent vehicle is compulsorily braked.

On the other hand, in a case where the intelligent vehicle straightly passes through out the intersection, since there is no direction indicating operation (No in S35), the compulsory braking control as described above is not carried out.

The processes as described above is repeatedly executed until the intelligent vehicle completely passes through out the intersection (turning right or straightly running) (S38). If it is determined, based on the calculated position of the intelligent vehicle and the figure information of the intersection, that the intelligent vehicle has completely passed through out the intersection, all the processes are terminated.

According to the above example, when the intelligent vehicle is going to turn right at the intersection, information is supplied to the driver of the intelligent vehicle. The information indicates whether there is another vehicle straightly approaching the intersection in the dead angle area Ed formed by a vehicle which is going to turn right in the opposite lane. In addition, it is determined whether there is a possibility of collision between the intelligent vehicle and the vehicle straightly approaching intersection in the dead angle area so that it is determined whether the driving operation for causing the intelligent vehicle to turn right is appropriate for the conditions in the intersection. Thus, the driver can carry out the driving operation to cause the intelligent vehicle to turn right at the intersection under a condition in which the driver recognize that there is a vehicle straightly approaching the intersection in the dead angle area. Further, due to the warning which is issued when the driving operation is not appropriate for the conditions in the intersection, the driver can recognize that the driving operation is not appropriate and correct the driving operation. Further, when the driving operation which is not appropriate is continued, the vehicle is compulsorily braked so that the collision with the vehicle straightly approaching the intersection from the opposite side can be prevented.

In addition, when the intelligent vehicle is going to straightly pass through the intersection, information is supplied to the driver of the intelligent vehicle. The information indicates whether there is a vehicle going to turn right from the opposite lane at the intersection in the dead angle area formed by a right-turn vehicle which is set in the same direction as the intelligent vehicle and at a position in front of the intelligent vehicle and near the center line of the road. It is determined whether there is a possibility of collision between the intelligent vehicle and the vehicle going to turn right from the opposite lane so that it is determined whether the driving operation causing the intelligent vehicle to straightly pass through the intersection is appropriate. Thus, due to the information supplied to the driver, the driver can drive the intelligent vehicle to straightly pass through the intersection under a condition in which the driver recognizes that there is a vehicle going to turn right from the opposite lane in the dead angle area. Further, due to the warning which is issued when it is determined that the driving operation is not appropriate, the driver can recognize that the driving operation is not appropriate and correct the driving operation.

In the above embodiment, the dead angle areas formed by vehicles (the opposite right-turn vehicle and the vehicle put in the same direction at a position near the center line) positioned in front of the intelligent vehicle is taken into account. However, the present invention is not limited to this, and dead angle areas formed by structures, such as medium strips and road signs, may be taken into account.

In a case where every vehicle ought to run on a right side of a road (e.g., in U.S.), the intersection warning system according to the present invention is useful for a vehicle which is going to turn right at an intersection.

The present invention is not limited to the aforementioned embodiments, and other variations and modifications may be made without departing from the scope of the claimed invention.

The present application is based on Japanese priority application No.9-206969 filed on Jul. 31, 1997, the entire contents of which are hereby incorporated by reference.

What is claimed is:

1. An intersection warning system provided in a vehicle comprising:

a receiving unit that receives watching information about states of bodies in a watching area including an intersection, the watching information being transmitted from a road watching apparatus which watches the watching area;

a vehicle position detecting unit that detects a position of said vehicle;

a dead angle area calculation unit that calculates a dead area for said vehicle based on the position detected by said vehicle position detecting unit and the watching information received by said receiving unit;

a first determination unit that determines whether there is another vehicle in the dead angle area calculated by said dead angle area calculation unit;

a running state detecting unit that detects a running state of said vehicle;

a second determination unit that, when said first determination unit determines that there is another vehicle in the dead angle, determines, based on the running state of said vehicle detected by said running state detecting unit and the watching information about said another vehicle in the dead angle area, whether a driving operation for said vehicle is appropriate; and a warning unit that issues a warning based on a determination result obtained said second determination unit.

2. The intersection warning system as claimed in claim 1, wherein said dead angle area calculation unit comprises:

a position calculating unit that calculates a position of a driver of said vehicle based on the position detected by said vehicle position detecting unit; and a unit that calculates the dead angle area for the driver based on the position of the driver calculated by said position calculating unit and the watching information about a body facing said vehicle, the dead angle area being formed by the body.

3. The intersection warning system as claimed in claim 1 further comprising:

a first course determination unit that determines whether said vehicle is going to turn at the intersection so as to cross an opposite lane, wherein when said first course determination unit determines that said vehicle is going to turn at the intersection so as to cross the opposite lane, said dead angle area calculation unit calculates the dead angle area for said vehicle formed by anther vehicle in the opposite lane.

4. The intersection warning system as claimed in claim 1 further comprising:

a second course determination unit that determines whether said vehicle is going to straightly pass through the intersection, wherein when said second course determination unit determines that said vehicle is going to straightly pass through the intersection, said dead angle area calculation unit calculates the dead angle area for said vehicle formed by another vehicle which is put in the same direction of said vehicle and at a position in front of said vehicle and near an opposite lane.

5. The intersection warning system as claimed in claim 1 further comprising:

a braking control unit that carries out braking control of said vehicle based on the determination result obtained by said second determination unit.

* * * * *

UNITED STATES PATENT AND TRADEMARK OFFICE
CERTIFICATE OF CORRECTION

PATENT NO. : 5,939,976
DATED : August 17, 1999
INVENTOR(S) : Kenji SASAKI et al.

It is certified that error appears in the above-identified patent and that said Letters Patent is hereby corrected as shown below:

Col. 16, line 2, after "obtained" insert --by--.

Signed and Sealed this

Sixteenth Day of May, 2000

Attest:

Q. TODD DICKINSON

*Attesting Officer*      *Director of Patents and Trademarks*